C. W. VOLNEY.
PROCESS FOR DRYING.
APPLICATION FILED DEC. 23, 1907.
909,261.
Patented Jan. 12, 1909.
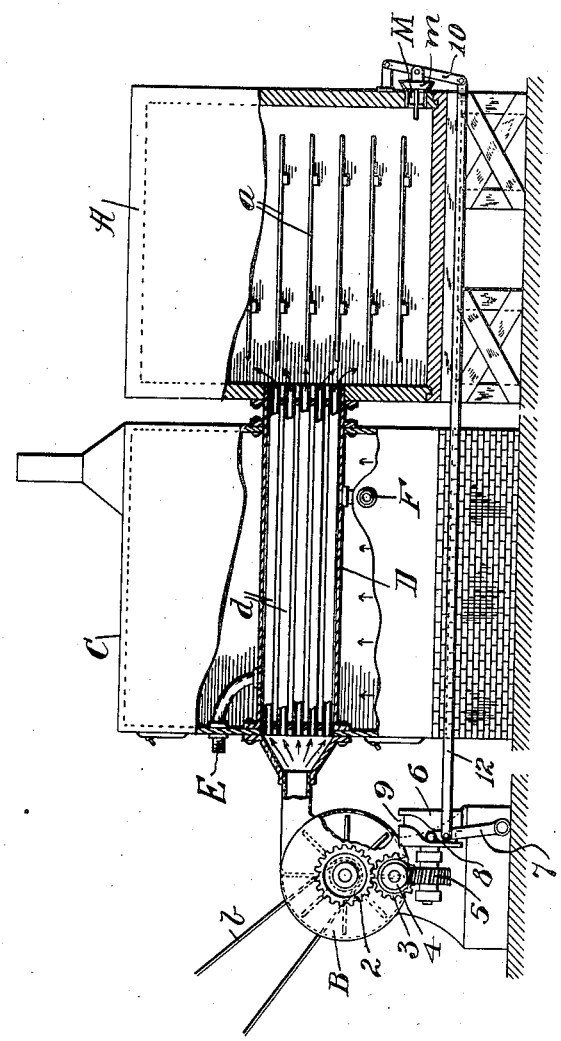
Witnesses:
Inventor:
Carl. W. Volney,
By his Attorney:

UNITED STATES PATENT OFFICE.

CARL WALTER VOLNEY, OF KEYPORT, NEW JERSEY.

PROCESS FOR DRYING.

No. 909,261.　　　　Specification of Letters Patent.　　　Patented Jan. 12, 1909.

Application filed December 23, 1907. Serial No. 407,835.

*To all whom it may concern:*

Be it known that I, CARL WALTER VOLNEY, a citizen of the United States, residing in Keyport, in the county of Monmouth and State of New Jersey, have invented certain new and useful Improvements in Processes for Drying, of which the following is a specification.

This invention relates to a process or method of treating or removing from material of various kinds, other material contained therein, or adherent thereto in the form of liquid or vapor; and has for its object to provide an improved method or process for this purpose whereby the material will be treated in a much shorter time and to a higher degree of dryness, and also in which the liquid or vapor is efficiently removed, not only from the surface or outside portions but from the interior, or interstices of the material or masses.

An apparatus for conveniently carrying out my improved process or method is illustrated in the accompanying drawing, being shown partly in section to set forth the interior construction.

The process consists broadly in placing the material in a closed vessel, preferably separated into a number of parts or portions, and distributed over considerable area as for instance being placed on shelves. A suitable drying gas is forced into this vessel, preferably atmospheric air that has been considerably heated. The vessel is provided with but a single outlet that is alternately opened and closed for periods of time of considerable duration, while the stream of heated gas or air is continuously forced into the vessel. Evidently, while the valve or outlet is closed, the air will accumulate in the vessel and the pressure will increase. Thereupon the valve is opened for a certain period of time, and the greater portion of the air will find exit through the outlet, until the pressure is considerably reduced. Then the valve is again closed, and the pressure permitted to rise again by fresh quantities of the heated air.

The apparatus illustrated in the drawing is shown as comprising a closed receptacle A that may be provided with a number of shelves $a$. Air is driven into the vessel A by a suitable pressure device such as a rotary pump or a blower B that may be driven by a belt $b$. Before passing into the vessel A the air passes through a heater C whereby its temperature is considerably elevated before passing into the drying vessel A. The heating device C is shown as comprising a tubular boiler member D that may have steam passed into it through an admission pipe E finding exit through an outlet pipe F. The air passes through the tubes $d$ of the boiler which are surrounded by the steam, and thus the air is considerably heated.

The drying vessel A is provided with an outlet opening at M controlled by a valve $m$. This valve is opened and closed at periods of considerable length by any suitable means working automatically, and which are preferably operated from the blower B. A gear 2 on the blower shaft meshes with a gear 3 carrying a worm 4, and the latter meshes with a worm wheel 5 on whose shaft is a cam drum 6. A lever 7 has at one end a roller 8 operating in the cam slot 9 whereby the lever is rocked. A lever 10 is pivoted to the valve $m$ and is connected to the lever 7 by a rod 12. By this means the rotation of the blower shaft will cause the valve to intermittently open and close, the gears and worm wheel causing the valve to be held open and closed for a considerable period of time. By this means a continuous flow of air under pressure and considerably heated will pass into the drying vessel A. While the valve is closed the air will accumulate in the vessel and the pressure will be elevated. As soon as the valve is opened the air will pass out until the pressure is very much reduced, whereby the moisture taken up by this heated air from the particles of the material will be carried out with the air through the valve. The increasing pressure of the air will force it into the interstices of the material and it will absorb the moisture therefrom. And when the valve is open, this air will be driven out not only by reason of the expansion of the air under pressure, but by reason of the continuous stream of air that is being forced into the drier. This will insure a complete change of the air or gas in the drier at each period that the valve is opened.

I find by experiment that with such an apparatus an increase of pressure of 40 to 80 mm. can be obtained, and which is very efficient for carrying on this process. The reduction of the pressure in the drier when the valve is opened will tend to dry or suck out the vapor from the interior of the masses and the continuous current of air will cause such moisture to be driven out of the vessel as fast as abstracted from the particles.

Where the process is carried on by the use of a rotary blower, only a moderate degree of pressure can be obtained, that will hardly exceed 70 or 80 mm. And such process is applicable to substances of an explosive or detonating character such as powder or nitro cellulose and other explosives, and may be safely used with such materials.

Having thus described my invention, I claim:

1. The herein described process or method of drying or removing volatile substances from various materials, consisting in placing the material in a closed vessel, and continuously forcing a heated gas into the vessel, and intermittently opening and closing an outlet in the closed vessel at periods of sufficient duration to considerably elevate the pressure in the vessel, and to then restore the pressure to normal and permit escape of the confined gas.

2. The herein described process or method of treating or removing volatile substances from various materials, consisting in placing the material in a closed vessel, and continuously forcing a heated gas into the vessel under a moderate pressure, and intermittently opening and closing an outlet in the vessel at periods of sufficient duration to considerably elevate the pressure in the vessel, and to then restore the pressure to normal and permit escape of the confined gas.

3. The herein described process or method of drying or removing volatile substances from various materials, consisting in placing the material in a closed vessel, and continuously forcing a dry heated gas into the vessel, and intermittently opening and closing an outlet in the closed vessel at periods of sufficient duration to considerably elevate the pressure in the vessel, and to then restore the pressure to normal and permit escape of the confined gas.

4. The herein described process or method of drying or removing volatile substances from various materials, consisting in placing the material in a closed vessel, and continuously forcing a dry heated gas into the vessel, and intermittently opening and closing an outlet in the closed vessel at equal periods of sufficient duration to considerably elevate the pressure in the vessel, and to then restore the pressure to normal and permit escape of the confined gas.

5. The herein described process or method of drying or removing volatile substances from various materials consisting in placing the material in a closed vessel, continuously forcing atmospheric air first through a vessel subjected to heat and thence into the said closed vessel containing the material, and intermittently opening and closing an outlet in the vessel containing the material at periods of sufficient duration to considerably elevate the pressure in the vessel, and to then restore the pressure to normal and permit escape of the confined gas.

6. The herein described process or method of drying or removing volatile substances from various materials consisting in placing the material in a closed vessel, continuously forcing atmospheric air first through a vessel subjected to heat and thence into the said closed vessel containing the material, and intermittently opening and closing an outlet in the vessel containing the material at equal periods of sufficient duration to considerably elevate the pressure in the vessel, and to then restore the pressure to normal and permit escape of the confined gas.

CARL WALTER VOLNEY.

Witnesses:
J. W. KEOUGH,
LETTIE ROGERS.